United States Patent [19]
Martenson

[11] 3,782,645
[45] Jan. 1, 1974

[54] FLOUR MILL

[76] Inventor: Leroy V. Martenson, 8141-7th Ave. S.W., Seattle, Wash. 98106

[22] Filed: Nov. 17, 1971

[21] Appl. No.: 199,640

[52] U.S. Cl. .............................. 241/100, 241/259
[51] Int. Cl. ............................................. B02c 7/14
[58] Field of Search ..................... 241/56, 57, 100, 241/101 R, 257 R, 259

[56] References Cited
UNITED STATES PATENTS

| | | | |
|---|---|---|---|
| 2,896,867 | 7/1959 | De Angelis et al. | 241/259 |
| 2,852,202 | 9/1958 | Ditting et al. | 241/100 X |
| 2,727,695 | 12/1955 | Harries | 241/259 X |
| 2,212,883 | 8/1940 | Meeker et al. | 241/257 R X |
| 2,343,757 | 3/1944 | Egedal | 241/100 X |
| 3,488,008 | 1/1970 | Bodine | 241/259 X |

*Primary Examiner*—Granville Y. Custer, Jr.
*Attorney*—Richard W. Seed et al.

[57] ABSTRACT

A flour mill adapted to be used in conjunction with and capitalize upon the self contained motor of a household type blender or other removable motor base. The mill is designed to receive whole grain cereal in the upper portion of a hollow grinding chamber which has an abrasive coating upon its inner surface whereat the cereal is subjected to a combination of attrition and contact grinding before being expelled from the side of the housing into a proper receptacle. The mill further includes an adjusting mechanism whereby the consistency of the flour may be controlled.

7 Claims, 6 Drawing Figures

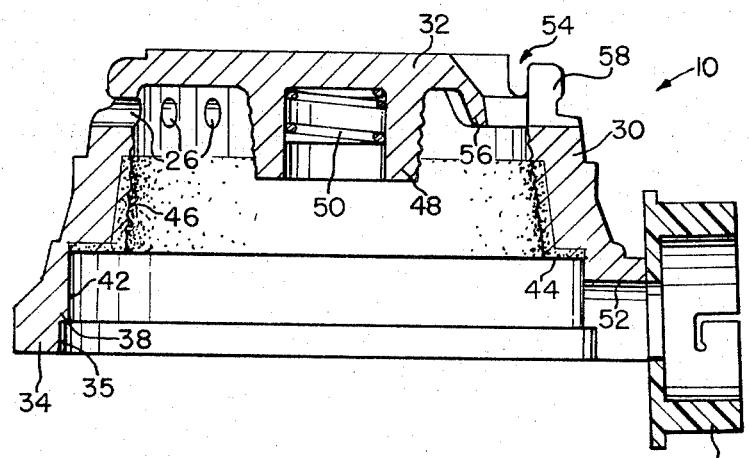
FIG. 2
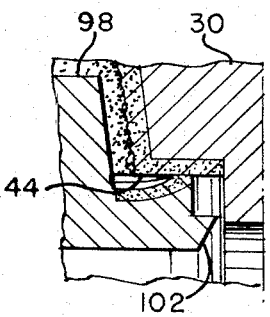
FIG. 6
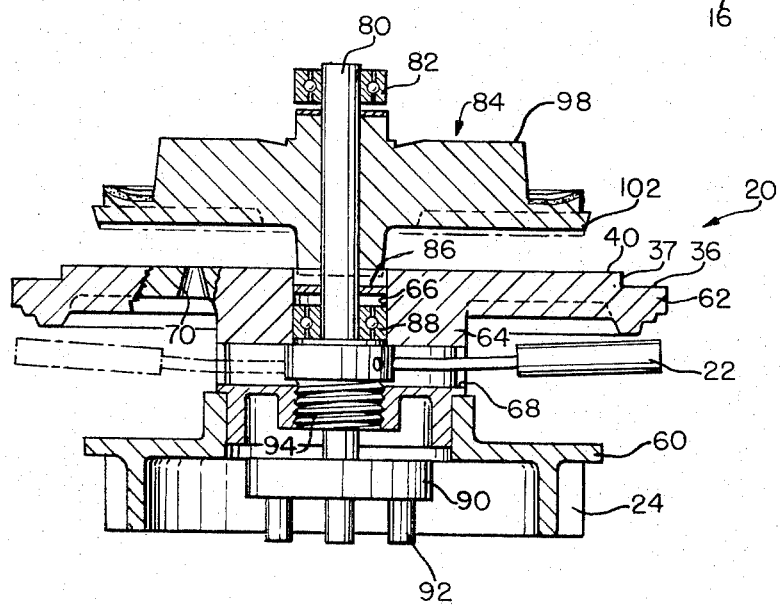
FIG. 3
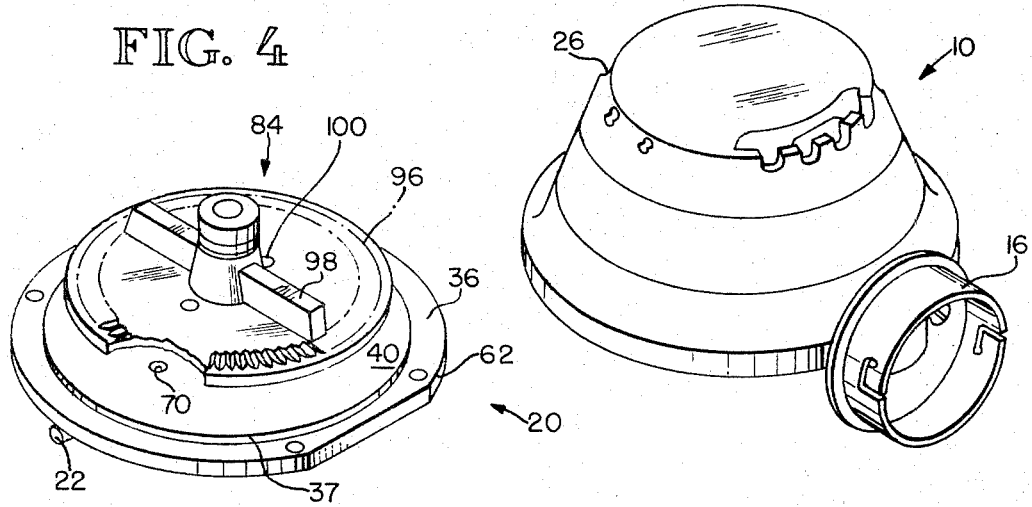
FIG. 4
FIG. 5

FLOUR MILL

BACKGROUND OF THE INVENTION

Flour mills are ordinarily rather large and cumbersome and require considerably more power to operate than is normally available in the home. It is further known that the heretofore employed flour mills commonly require repeated grinding and bolting in order to obtain flour of fineness and uniformity required.

Attempts have been made to produce a flour mill of the type which may be used in the home, two of which are described in U.S. Pat. No. 2,343,757 granted to Egedal, Mar. 7, 1944 and U.S. Pat. No 2,627,376 granted to Lee on Feb. 3, 1953. Whereas both of these flour mills improved upon the flour milling mechanism and techniques previously used insofar as allowing this operation to be done in the home without a great deal of skill or training they both suffer from the drawbacks of being large, bulky machines and requiring a separate power source. In addition to the drawbacks hereinabove noted the flour mills did not do a completely satisfactory job and were subject to the problem of caking or jamming of the material within the machine when not properly operated, thus requiring frequent clearing of the grinding chamber.

Since most of the cereal grains retain their nutritional value and flavor for a far greater period of time if they are stored in their whole kernel condition, it is desirable that the individual household have a flour mill where grain must be stockpiled, whether for a religious, nutritional, or for a security reason. It is to be understood that although it is desirable to have a mill in the home it is also necessary to keep cost to a minimum thus enabling the average household to afford the mill. It is therefore desirable to have a mill which is easily operated by the average housewife and preferably is operated by the motive power of another standard appliance as well as being small for ease of storage.

With the above noted problems in mind it is an object of the present invention to provide a flour mill for use in the home which is compact, simple of operation and further is not subjected to the problems heretofore known.

It is another object of the present invention to provide a flour mill for use in the home which receives its motivating power from a standard household blender and is adapted to easily be operationally placed thereon.

Another object of the present invention is to provide a flour mill for use in a home which includes means to adjust the relative position of the grinding elements thereby controlling the texture of the flour.

It is yet another object of the present invention to provide a flour mill for use in the home which includes a novel means for introducing the unground whole grain to the grinding chamber whereby the amount of grain introduced is kept under control by the grinding action itself rather than a mechanical governor thereby preventing jamming of the machine.

BRIEF DESCRIPTION OF THE DRAWINGS

FIG. 2 is a vertical sectional view through the upper portion of the flour mill.

FIG. 3 is a vertical sectional view through the lower portion of the flour mill.

FIG. 4 is an isometric view of the lower portion of the flour mill depicting the grinding disc and vanes.

FIG. 5 is an isometric view of the upper portion of the flour mill showing the air inlet and flour inlet openings.

FIG. 6 is an enlarged sectional view showing the relationship between the grinding disc and the abrasive bonded to the housing of the upper portion.

DETAILED DESCRIPTION OF THE DRAWINGS

Figure 1:
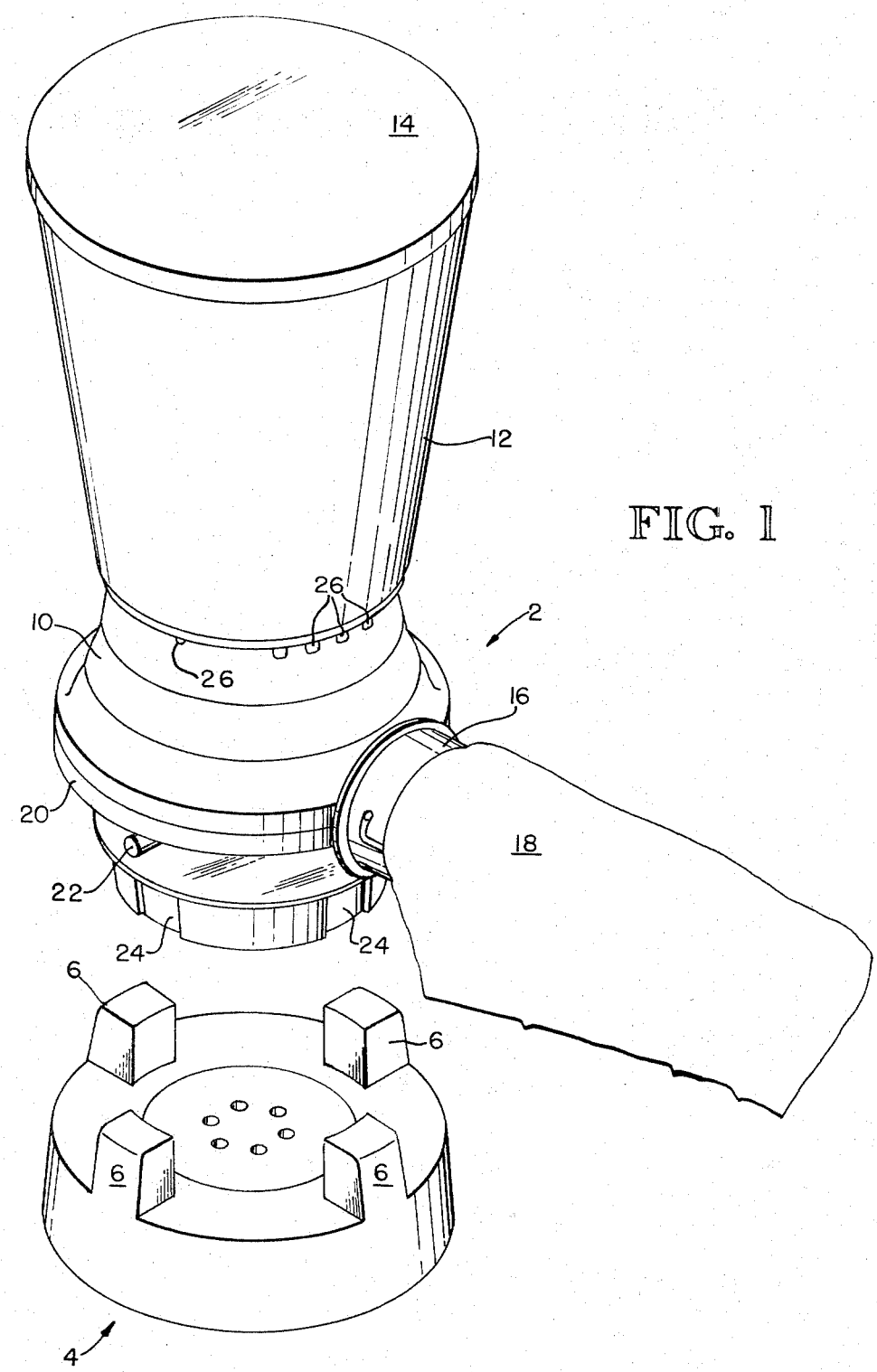
FIG. 1 is an isometric view of the flour mill in accordance with the present invention shown exploded from a typical blender base.

As can be seen in FIG. 1, the flour mill comprises a base element 2 adapted to be drivingly mounted upon the top of a standard household blender 4. As is true in the situation in most household blenders, the base element includes a plurality of upstanding portions 6 adapted to interlock with a complementary indentation on the base of the driven element thus preventing it from turning. The blender further includes driving means to interact with the driven mechanism and thus provide the motive power necessary to drive the appliance from the motor of the blender. It is to be understood that the base as shown is usable with two readily available blender models but that either interchangable bases or adapters are contemplated such that the mill is universally usable.

As will be described in greater detail hereinafter the base element 2 of the flour mill comprises an upper section 10 which is adapted to receive thereon in operational relationship a grain cannister or hopper 12. The cannister or hopper 12 has a lid 14 and is open at the bottom as hereinafter described. The upper section 10 has at its bottommost portion a flour outlet port 16 adapted to receive a bag 18. The lower portion 20 of the base element 2, which as described hereinafter, contains the operating elements and includes an adjusting means 22 for predetermining the texture of the flour and a plurality of indentations 24 to receive the protrusions 6 of the blender base as described hereinabove. It is to be understood that in operation, the upper portion 10 and the lower portion 20 of the base 2 will be secured together in a fixed relationship by any appropriate means. Also, as can be seen in this view, the upper area of the upper portion 10 of the base 2 includes a plurality of air inlets 26, some of which permit air to enter the hopper and others allow air to enter the grinding chamber. The particular shape of the holes or location upon the mechanism is determined by esthetics and ease of manufacture.

Referring now to FIGS. 2 and 5 in combination the upper portion 10 of the base element includes a generally inverted cup-shaped housing 30 with a generally flat upper surface 32. The housing 30 is flared slightly outwardly at the lower portion and has a stair step inner configuration as described hereinafter. The lowermost flat surface 34 of the stair step configuration is also the lower edge of portion 10 and is adapted to rest upon an outwardly extending ledge 36 in the lower portion of the housing. As noted above, the two portions are designed to be secured together by means of screws, bolts or the like. The second stair step 38 is adapted to rest on a flat surface 40 in the lower portion of the housing such that the combination of the surfaces 34, 38 and their joining surface 35 in cooperation with the mating surfaces 36, 40 and their joining surfaces 37 form an essentially airtight seal where the two portions of the housing are joined.

Proceeding upwardly in the interior of portion 10 from the stair step 38 an elongated vertical section 42 defines the chamber within which the actual grinding rotor will function as described in greater detail hereinafter. The upper portion of the chamber wherein the rotor is designed to operate is defined by an inwardly projecting ledge 44 which is adapted to overlie the rotor as described in greater detail hereinafter.

Extending vertically upwardly from the inwardly extending ledge 44 is an inwardly tapered surface having a carborundum or other abrasive material secured to the inner surface such that the whole grain may be impelled against by means hereinafter to be described and thus pulverized to a certain extent. The holes 26 as described hereinabove are located approximately at the top of the abrasive surface and extend outwardly through the housing 30. The location of the holes 26 is more critical with respect to the location of the hopper than to the grain grinding chamber it being necessary that air is allowed to continually flow into the chamber and thus not be closed by the hopper or cannister.

Centrally located in the inner surface of the upper portion of the chamber is a downwardly depending integral sleeve member 48 having a compression spring 50 located therein. When the flour mill is in its assembled condition a bearing mounted upon the rotatable shaft passing through the lower housing will be slip fitted within the sleeve 48 compressing the spring 50 and thus be securely held in position and will respond to movement of the adjusting means since it continuously forces the grinding mechanism downwardly.

With the exception of the location of the discharge outlet 16 which, in the preferred embodiment, comprises a plastic sleeve having a central port therein which is secured to an opening 52 in the bottom of the upper housing 30, and the air inlet ports 26, the exterior configuration of the upper housing 30 is not critical but should be esthetically pleasing.

As noted hereinabove, the supply of grain to be ground is held in a hopper above the top of the upper portion of the housing 30 and is fed into the attrition chamber hereinabove described by means of a vertical inlet 54. The inlet has a funnel shaped or tapered interior surface thus allowing more of the grain to flow by gravity and assisted by a partial vacuum in the chamber into the attrition chamber and further extends downwardly into the chamber in the form of a downwardly extending lip 56. The entry portion further has air inlets slots 58 for reasons identical to the purpose for holes 26 as described in greater detail hereinafter. The fact that the lip extends down into the attrition chamber permits a buildup of ground or partially ground material at the bottom of the inlet chamber thereby terminating the normal flow. The downwardly extending portion resists compacting at this point and further prevents the chamber from becoming overfilled since there will always remain a slight gap or void above the maximum amount of material which can be fed into the chamber by means of the downwardly extending inlet port 54.

The lower housing 20 includes, as described hereinabove, a base portion 60 adapted to rest upon the top of the standard household blender and includes a plurality of depressions 24 or the like for interaction with the blender thus holding the housing in a relative secure position. Secured to the upper portion of the generally hollow base member 60 is a disk 62 having a downwardly depending neck portion 64 and a bore 66 centrally located therein said bore 66 having a threaded lower end. Neck portion 64 also includes a sectorial slot 68 extending to the bore intermediate the ends. It is to be noted that the element 62 is terminated at its upper portion by a wide relatively planar flange having the stairsteps 36, 37 and 40 described hereinabove and this flange serves as the bottom of the grinding chamber as well as the sealing support for the upper portion 10. It is within the contemplation of the present invention that the flange may also include a plurality of vent holes 70 near the interior portion of the flange such that air will be drawn into the grinding chamber and serve as a cooling medium.

Extending through the center bore in the lower housing 20 is a rotatable shaft 80 having a press fit bearing 82 upon its uppermost end for cooperation with sleeve 48. A grinding disk or flywheel 84 to be described in greater detail hereinafter is mounted to shaft 80 beneath the roller bearings 82. A dust seal 86 and a second set of bearings 88 are fixed beneath the flywheel 84 and within bore 66.

The shaft extends downwardly beneath the bottom of neck 64 to terminate in a mechanism adapted to receive rotation from the motor unit of a standard blender. In the Figure as shown, rotation receiving mechanism comprises a disk 90 mounted upon shaft 80 and a plurality of downwardly depending fingers 92, however, it is to be understood that this disk could equally well be any other configuration which would appropriately engage with the blender unit.

Mounted within the threaded portion at the bottom of bore 66 is a threaded sleeve 94 upon which is mounted a handle 22 which extends through slot 68. The upper portion of the sleeve 94 is in contact with the lower portion of the bearing 88 such that movement of the handle within the slot 68 causes the sleeve to move vertically with respect to the relatively fixed housing thus pressing upwardly or pulling downwardly on the sleeve of the bearing mechanism 88 as well as bearing 82 reacting against spring 50 and thus moving the rotor or flywheel 84 for purposes to be hereinafter described.

Referring now to FIG. 4 the flywheel or rotor mechanism 84 can be seen in greater detail and it will be seen that the flywheel includes an upper abrasive surface 96 which is preferably in a scalloped configuration but having a relatively flat outer periphery for cooperation with surface 44. The portion of the disk interior to the abrasive surface is generally of a flat configuration and includes a pair of upstanding vanes 98. It is to be noted in this view also that holes 100 may also be provided adjacent the hub of the flywheel, again to provide cooling ventilation. Referring again to FIG. 3 it is to be noted that there are similar vanes 102 in the underside of the flywheel for purposes to be hereinafter described.

In operation, the whole grain is placed within the container 12 and the blender started thus driving the shaft 80 and its attached flywheel 84. The grain enters the grinding chamber by means of the opening adjacent lip 56 and by contact with the vane 84 is thrown against the abrasive surface 46 and thus broken down by attrition. The grain is continually forced in an outward direction by centrifugal force as well as by the vanes 98 and when it reaches a size sufficiently small it will pass between the upper abrasive scalloped surface 96 of the flywheel and the downwardly facing surface 44 and enters the lower part of the chamber. The vanes 102 will force the flour outwardly and the ground grain which is now flour will pass through the aperture 16 into the bag 18. It is to be understood that the handle 22 allows the operator to adjust the relative position of the flywheel 62 and its abrasive surface 96 with respect to the downward facing abrasive surface 44 thus completely controlling the texture of the finished flour since it is here where the final grinding takes place. During this grinding operation air is continuously fed into the grinding chamber via hole 26 and the upper portion of the housing which as noted above are located such that they are not closed when the container 12 is snapped into position and through hole 70 in bottom portion of the lower housing thus providing a continual higher pressure area within the chamber forcing flour outwardly thereof.

It is to be noted that although the opening for the discharge of the flour 16 is shown with a bayonet type fastening means for the bag it could easily well include a threaded means or a snapon fixture. Likewise even though the container is shown in a snapped on position for the upper housing it could equally well be any one of any well known means of holding it in position.

Thus it can be seen that the hereinabove described invention provides a simple inexpensive flour mill such that the home owner may easily use whole grain as necessary while retaining the flavor and food content for a greater period of time.

The embodiments of the invention in which a particular property or privilege is claimed are defined as follows:

1. A flour mill for use with the motorized base of a household blender and adapted to receive its operational forces therefrom, said mill comprising;
   a base member adapted to cooperate with the removable blender base and be supported thereby,
   vertical shaft means adapted to be driven by the motor base mounted for rotation within the base member,
   disk means secured to the shaft means for rotation therewith, said disk including radial, upwardly extending vanes upon its upper surface for agitating material contacting the disk and impelling it outwardly thereof, said disk further including an upper abrasive surface,
   hollow cover means adapted to be secured to the base member in a position overlying the disk means and forming with the base means a hollow chamber surrounding the disk means, said cover means including an opening at the top portion for the entry of whole grain and an opening through the side, generally below the location of the disk, for exit of the flour,
   an abrasive coating bonded to the interior of the cover means along a vertically extending wall surrounding and proximate the outboard end of the vanes of the disk and along a horizontally extending surface overlying the disk whereby grain thrown outwardly by the vanes upon the disk will be abraded by contact with the wall, and grain between the upper portion of the disk and the horizontal portion of the cover will be tritrated,
   means for guiding grain into the mill, and
   means for capturing the flour whereby the entire operation may be accomplished with little attention.

2. A flour mill as in claim 1 wherein the disk means is axially adjustable varying the spacing between it and abrasive surface of the cover means and thus regulating the texture of the flour.

3. A flour mill as in claim 1 wherein the disk means includes a serrated abrasive upper surface at the outer edge tapering to a smooth outermost surface capturing grain in the lower portions of the serration and grinding the particles with the upper portions and outer edge thus controlling the texture.

4. A flour mill as in claim 1 wherein the grain entry opening includes a lip which extends downwardly into the chamber presenting a barrier preventing a buildup at the entry opening which would clog the opening and prevent flow of grain inwardly thereof.

5. A flour mill as in claim 2 wherein the shaft is mounted to a bearing which is supported by a threaded sleeve and further includes a handle projecting outwardly of the base allowing movement of the sleeve and thus the shaft and supported disk.

6. A flour mill for household use comprising;
   a base member for operational placement upon the motor or base unit of a household blender, said base member including means to interact with the blender, holding the base member in a fixed vertical position,
   shaft means mounted for rotation within the base member and including means at the lower end thereof to functionally interconnect with the upwardly facing driven element of the blender base,
   horizontally disposed disk means mounted to the shaft for rotation therewith, said disk including radial vanes for impelling material outwardly,
   hollow cover means adapted to be secured to the base member and overlie the disk means forming a chamber to capture material in a location adjacent the disk, said cover means adapted to be secured in a position where an internal shoulder overlies and is in close proximity to the abrasive surface of the disk and including an abrasive bonded to a vertically extending inner surface of the cover means adjacent the disk whereat grain impelled outwardly by the vanes upon the disk will be subjected to abrasion and including an opening above the disk to allow entry of unmilled grain and an opening below the disk to permit exhaust of the milled material,
   container means mounted above the cover means to hold material to be milled, and
   container means adapted to be secured adjacent the opening below the disk to receive the milled material.

7. A flour mill as in claim 6 wherein the disk is axially adjustable varying the distance between the upper surface of the disk and the shoulder allowing control of the size of the milled material.

* * * * *